June 8, 1965  O. J. POUPITCH  3,187,420
NONLINEAR GEARING AND APPARATUS UTILIZING
NONLINEAR GEARING FOR INDEXING
Filed June 1, 1962  6 Sheets-Sheet 1

INVENTOR.
Ougljesa Jules Poupitch
BY
ATTYS.

June 8, 1965  O. J. POUPITCH  3,187,420
NONLINEAR GEARING AND APPARATUS UTILIZING
NONLINEAR GEARING FOR INDEXING
Filed June 1, 1962  6 Sheets-Sheet 5

INVENTOR.
Ougljesa Jules Poupitch
BY
ATTY'S.

June 8, 1965
O. J. POUPITCH
3,187,420
NONLINEAR GEARING AND APPARATUS UTILIZING
NONLINEAR GEARING FOR INDEXING
Filed June 1, 1962
6 Sheets-Sheet 6
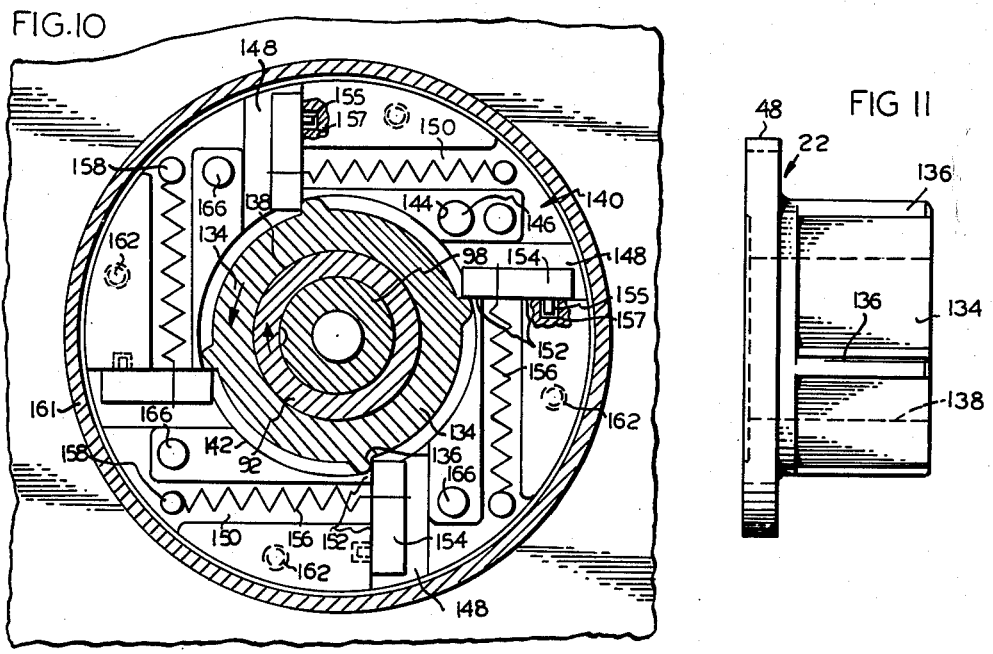
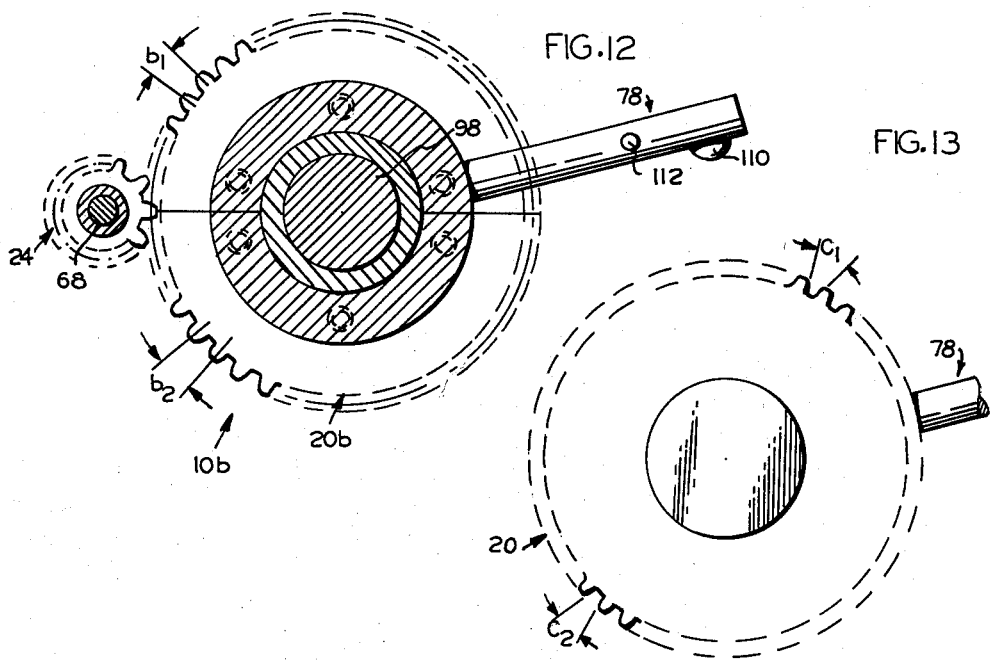
INVENTOR.
Ougljesa Jules Poupitch
BY
ATTYS.

United States Patent Office 3,187,420
Patented June 8, 1965

3,187,420
NONLINEAR GEARING AND APPARATUS UTILIZING NONLINEAR GEARING FOR INDEXING
Ougljesa Jules Poupitch, Itasca, Ill., assignor to Illinois Tool Works Inc., Chicago, Ill., a corporation of Delaware
Filed June 1, 1962, Ser. No. 199,363
21 Claims. (Cl. 29—208)

This invention relates to a form of gearing of nonuniform rotation as well as apparatus utilizing nonuniform rotation to accomplish intermittent movement.

Variable velocity gearing has a variety of uses, such as providing the means for accomplishing indexing, operating instruments of various types, in servo devices, and in computing mechanisms. Cam mechanisms, eccentric gears, four bar linkages, and elliptical gears are mechanisms recognized to produce a nonlinear cyclical output from a constant velocity rotary input. Nonlinear gearing, as it will be named here, means any gear, gear set, or gear train wherein the motion supplied to the gear or gear system (usually a rotation of constant angular velocity) is modified by the gear or gear system so that the output motion is not of constant angular velocity (simple reduction or speed up). A graph of the output motion per revolution of the output shaft is not a straight line. Each of these prior art devices for producing nonlinear motion have disabilities and limitations as to their cost, ease of manufacture, accuracy, versatility, adjustability, criticality of dimensions and compactness for use in various environments. This invention is directed toward gears of the type preferably having fully generated tooth forms, which are adapted to rotate on true centers, and have substantially uniform outer peripheries (circular in the case of spur gears, and similar geometric shapes for face gears, worm gears, etc.). The spacing of the gear teeth is nonuniform and so is their shape, but the combination of spacing and shape is such as to permit the gear teeth to mate with other fixed true center gears having substantially uniform teeth thereon. Additionally, the invention is readily adapted for use in epicyclic gear trains wherein the aforenoted gear construction produces an improved, compact, accurate indexing mechanism when incorporated in a rotary fastener and washer assembly unit usually associated with and operated in conjunction with a thread rolling apparatus.

It is an object of this invention to provide nonlinear gearing which is readily manufactured by conventional techniques, where the output characteristics are measured by wave form and varied within fairly large limits, while retaining most of the advantages of standard linear gearing.

It is another object of this invention to provide a gear set of the type set forth above comprising two gears which do not need to have their teeth oriented relative to each other, thus permitting the phase of the output wave form to be shifted as suitable and desired, and permitting the movement of gears into and out of mesh as desired.

A further object of this invention is to provide nonlinear gears in sets which are particularly well adapted for use in an epicyclic gear train to produce an output movement which provides a dwell time.

A still further object of this invention is to provide epicyclic gear trains which will produce an indexing movement for an index plate or the like, which gear train is compact and concentric with relation to the index plate, the indexing movement being accomplished with controlled movements of acceleration and deceleration.

A still further object of this invention is to provide an epicyclic gear train having input means for simultaneously driving an index plate and a second device in timed relation thereto whereby the motion of the index plate may be synchronized with the second device by adjusting means provided in the epicyclic gear train, the synchronizing adjustments being readily accomplished while input and gear train are in motion.

A still further object of this invention is to provide dampening means for an epicyclic gear train where its intended use is in an indexing mechanism to eliminate the effect of minute tooth to tooth spacing errors or vibrations in the gear train and thereby assure smooth acceleration and deceleration in the output movement of said gear train.

A still further object of this invention is to provide an assembly attachment for a thread rolling machine including a fastener element feeding device and a washer feeding device, the washer feeding device utilizing the aforementioned epicyclic gear train to increase the efficiency of the assembly of the fasteners and washers.

A still further object of this invention is to provide an epicyclic gear train in an assembly unit which causes rotary fastener blanks to be carried to an assembly station which is adapted to be telescoped with a waiting washer, said gear train increasing the efficiency of assembly by a large factor over a range of different speeds of operation and facilitating synchronization.

Lastly, it is an object of this invention by reason of the construction of the gear train and other elements to permit ready change of washer plates adapted to carry washers to the assembly station so that a variety of differen shapes and sizes of washers may thereby be fed with assured relatively trouble-free operation of the attachment.

The novel features that are representative of the invention are set forth with particularity in the appended claims. The invention itself, both as to its structure and method of operation, together with additional objects and advantages thereof, will best be understood by the following description when read in connection with the accompanying drawings, in which:

FIG. 10 is a sectional view along lines 10—10 of FIG. 8 showing the preferred form of clutch mechanism in the assembly attachment mechanism;

FIG. 11 is a side elevational view of one of the gears in the epicyclic gear train shown in FIG. 8, the hub of which serves as part of the preferred clutch mechanism shown in FIG. 10;

FIG. 12 is a semidiagrammatic view of one form of index gear and pinion; and

FIG. 13 is a partial view of the preferred construction of an index gear and pinion, said view being taken approximately along line 13—13 of FIG. 8.

Figure 1:
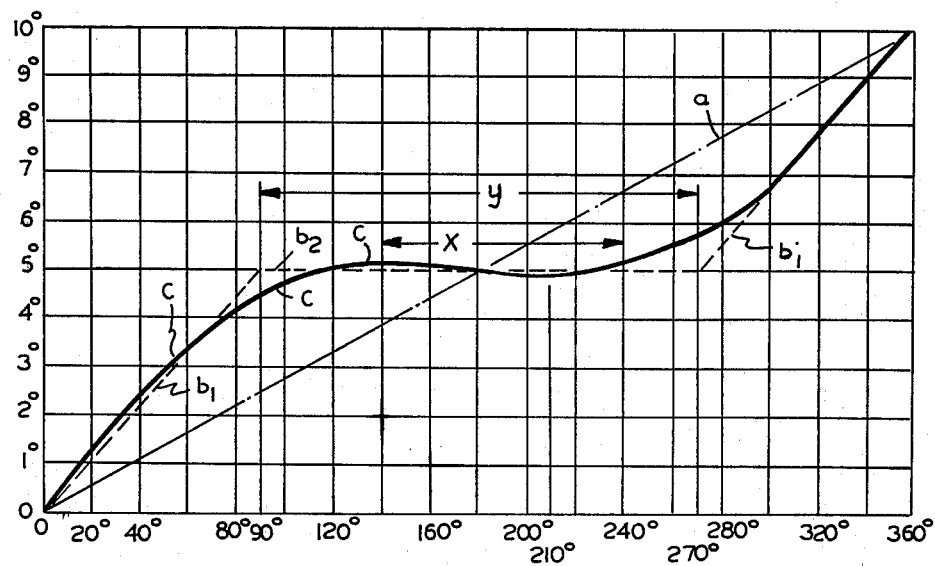
FIG. 1 is a graph of output against input motion of the epicyclic gear train shown in FIG. 3 together with other curves of output and input for purposes of illustrating the invention.

While the nonlinear gearing and the epicyclic gear train shown in the drawings and discussed hereinafter have a special utility and greatly increase the efficiency and versatility of a machine for assembling fastener members to washers, it should be remembered that nonlinear gearing generally and the epicyclical gear train as described herein each have a usefulness and utility of much broader application.

The increased use of automatic machinery in manufacturing operations and the steadily advancing technology of instrumentation has produced an ever increasing demand for gearing which will provide a nonlinear output. While various other mechanisms such as cam mechanisms, levers and linkages will produce a nonlinear output, gearing has many well known advantages over such in many applications. Types of gearing known to the applicant to be available to provide a nonlinear output can be classified into two groups; first, the so-called noncircular gears are exemplified by elliptical gears, square gears and logarithmic spiral type gears; secondly, circular gears mounted on eccentric centers. Each of these two groups of gearing have disadvantages in certain environments and present difficulties in design and manufacture. One common disability that accrues to both of the above two groups of nonlinear gearing is the difficulty or impossibility encountered when a change in phasing of the wave form produced is desired. Such pairs of gears are fixed in their relative position to one another. Generally speaking, there is only one position of orientation of one gear relative to the other for the desired results.

The novel form of nonlinear gearing about to be discussed permits use of standard circular gear blanks (when spur gearing is involved) in manufacture. The gears are made to revolve about their centers, the nonlinear output of the gear set being determined by a predetermined differential in the size and/or shape and spacing of the gear teeth of at least one of the gears. Another feature of the new nonlinear gearing is that one of the two gears may be (but is not limited to) a standard gear in all respects with uniform spacing and uniform teeth, the other gear having variable spacing and/or shape of teeth. It is preferred that a common and uniform base circular pitch between all teeth be maintained, this latter approach assuring an ideal mating and coaction between all members of the gear set.

While the contemplated nonlinear gearing will be discussed in terms of a modified somewhat sinusoidal wave form of output versus input motion, this is to be considered as being only illustrative rather than limiting inasmuch as the wave forms may be varied within very wide limits as suitable and desired.

*Nonlinear gearing and epicyclic gear train*

The nonlinear gear set 10 utilized in an epicyclic gear train 12 may be readily adapted to provide a washer hopper apparatus 14 with smooth intermittent indexing movement and dwell. The washer hopper apparatus 14 is associated with a fastener feeding apparatus 16, both the washer hopper apparatus 14 and the fastener feeding apparatus 16 being mounted on a thread rolling apparatus 18 (see FIG. 5). The precise utilization of the nonlinear gearing and the epicyclic gear train in the apparatus 14 for association with a fastener feeding apparatus 16 will be discussed in a later section of this specification.

The nonlinear gear set 10 when used in an epicyclic gear train comprises first gear means 20, second gear means 22, and third gear means 24. When used in a nonlinear gear set 10 per se, only gears 20 and 24 and their cooperation need be considered. The cooperation of gears 20 and 24 is shown in fragmentary views in FIG. 4.

While the third gear means 24 (identified in FIG. 3 as the pinion) and the first gear means 20 (identified in FIG. 3 as the index gear) will be shown and discussed with the index gear being the gear provided with the non-uniform teeth, it will be obvious that either or both the index gear and the pinion may have teeth which are non-uniform in shape and spacing while maintaining the advantages that accrue to the instant nonlinear gearing. It will also become obvious that the reference gear (second gear means 22) may be a standard gear or may be of modified tooth form depending upon the output characteristics desired. It will be further appreciated that while the gearing discussed is in the form of parallel axis gearing, the same characteristics may be obtained in various right angle gearing systems (such as for example spiral bevel gears) and in certain forms of skew axes gearing. It will be apparent to those skilled in the art, that the invention to be discussed may be used in any type of gearing system where full generated tooth forms are used.

Figure 4:
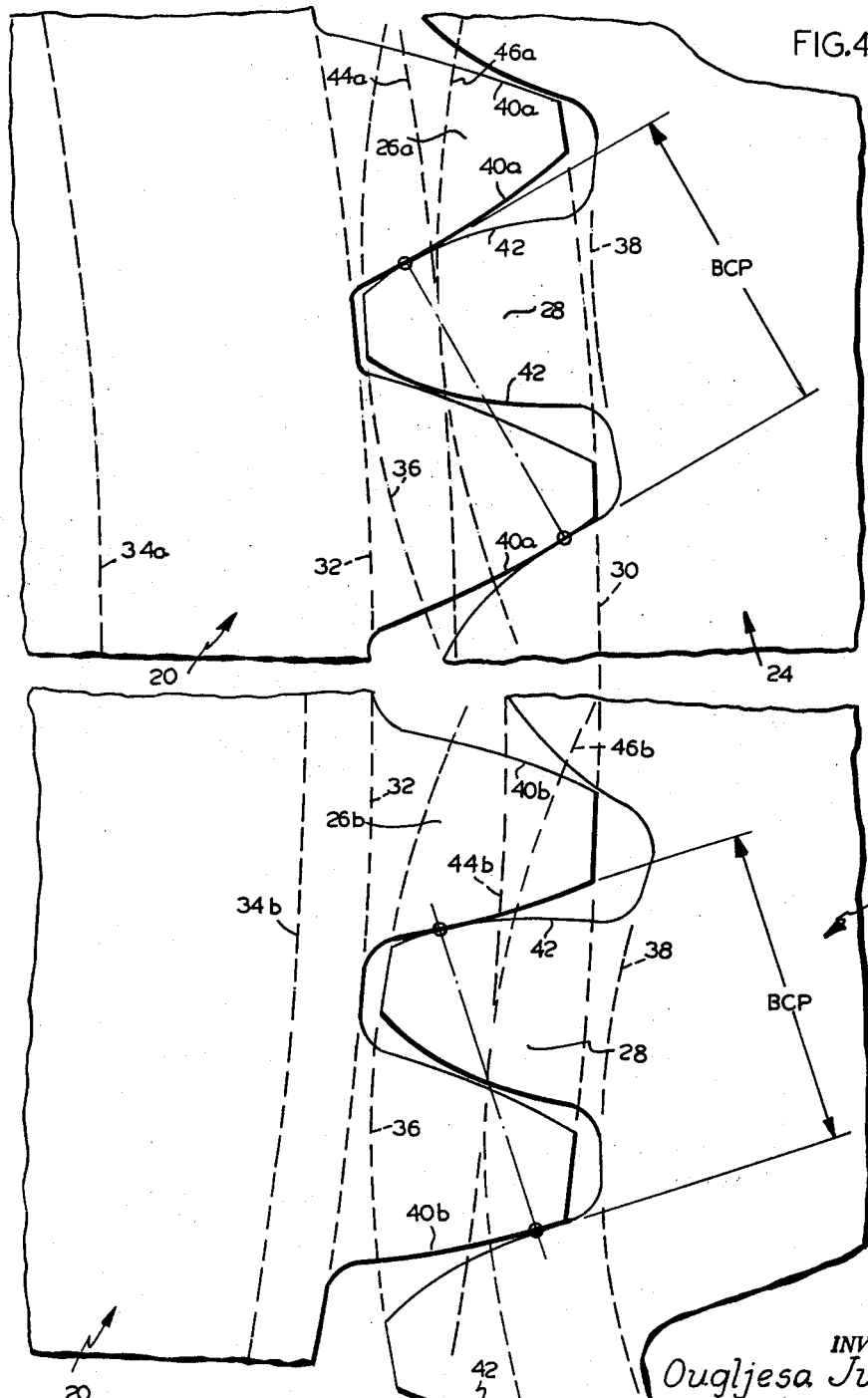
FIG. 4 is an enlarged fragmentary view of the index gear and pinion shown in FIGS. 3 and 8, the cooperation of which produces a wave form output motion shown in the graph in FIG. 2.

Index gear 20 is formed from a circular gear blank with teeth 26a–26b provided on the periphery of the blank which, though they are at a uniform distance from the center of the gear blank, each differs in shape and has different interdental spacings. The pinion 24 has teeth 28 thereon adapted to mate with the teeth 26a–26b of the index gear 20. The teeth 28 of pinion 24 are uniform in spacing, shape and distance from the center of the pinion. A detailed view of coacting teeth 26a and 26b of index gear 20 with the teeth 28 of pinion 24 is shown in FIG. 4. The upper portion of FIG. 4 of the drawings shows a fragmentary sector of the gear teeth 26a of the gear 20 mating with the pinion teeth 28, while the lower portion of FIG. 4 shows a different sector of the same two gears in mating engagement. Certain construction lines have been drawn on FIG. 4 to facilitate the understanding thereof. More particularly, dotted line 30 is the outer diameter of gear 20 and it will be perceived that even though the teeth 26a and 26b differ in shape or size, the outer diameter 30 is maintained substantially constant (within manufacturing tolerances) about the periphery. The construction line 32 interconnects the root diameters of the teeth 26a and 26b and is shown to be a constant diameter although this may be varied for backlash considerations when such considerations enter into the particular gearing construction desired. However, this root diameter, except for modifications for backlash, is maintained substantially constant on the gear 20. The base diameter for gear 20 varies in accordance with the desired wave form output curve expected from the gear 20. The base diameter 34a here shown for illustrative purposes is the base diameter for a 72 tooth gear and the teeth 26a shown illustrate a 72 tooth involute form. The base diameter 34b has been moved radially outwardly from the base diameter 24a in the lower segment of gear 20 shown in FIG. 4 and the base diameter gives rise to the tooth form 26b which is essentially the involute tooth form of a 76 tooth gear. It will be appreciated that the base diameter changes with the tooth form and that the base diameter may be varied on the same gear progressively and regressively from tooth to tooth on sectors of teeth to sectors of teeth within limits. The factor which determines the desired change in base diameter is the output wave form desired as previously discussed.

The teeth 28 on the gear 24 have a substantially constant radial extent 36, a substantially constant root diameter 38, and all teeth have substantially identical interdental spacing. The teeth provided on both gears 20 and 24 have involute forms, the teeth 26a having an involute form 40a, the teeth 26b having involute forms 40b with all of the teeth 28 on gear 24 having identical involute forms 42. It is to be particularly noted that even though teeth 26a and 26b differ in the sense that they are involutes of different base diameters, all teeth on gear 20 have the common characteristic of having the same base circular pitch. This is denominated by the reference numerals BCP in FIG. 4. The BCP of standard uniform involute gears often represents in gear terminology the circumference of the base circle divided by the number of teeth on the gear. Another way of representing BCP is to say it is a constant and represents the length of the line normal to an involute tooth surface extending from a point on that tooth surface to an intersecting tooth surface on the next adjacent tooth. It is in this latter sense that all the teeth on gear 20 have the same or a constant BCP even though the base diameters change or even though the "base curve" is not a circle. The angularity of the BCP of gear 20 varies with the variable tooth shapes that may be placed on the index gear 20 but it is always the same dimension. Having the same BCP on all teeth assures smooth rolling action between the gears 24 and 20 since all mating involute gears must have equal base circular pitches for smooth rolling action. Because the gears 24 and 20 have the same BCP, they may be taken out of mesh and remeshed in a different orientation if desired.

Figure 2:
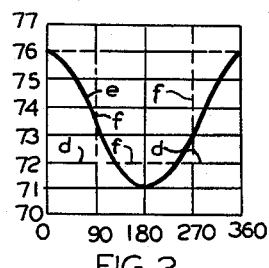
FIG. 2 is a graph showing the nonlinear output motions of the gear sets shown in FIGS. 4, 12 and 13 and a linear output curve for purposes of illustration.
Figure 6:
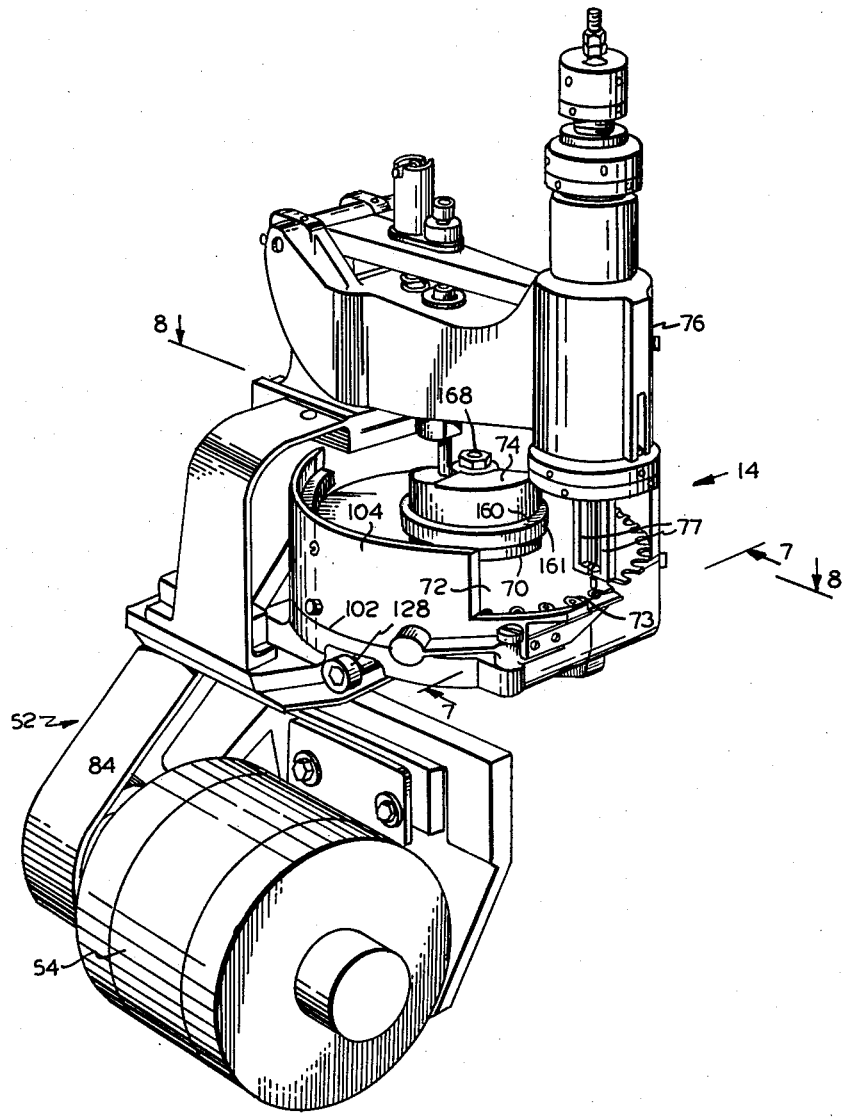
FIG. 6 is a perspective view of the attachment which utilizes the invention shown detached from the thread rolling machine shown in FIG. 5, said view being taken from the opposite direction of FIG. 5.

There is shown in FIG. 2 a graph on which has been plotted an indication of the change of tooth forms on a spur gear, as for example gear 20, which causes nonlinear output motion as it is driven in meshed relation with a plain spur gear. The curve $e$ in FIG. 2 indicates the incremental change in tooth forms over 360° of the gear 20. Starting at a point of gear 20, the particular varying gear tooth forms (in terms of equivalence to a 71—72—73—76 toothed gear) are shown on the vertical portion of the graph. An indication of the change in shape of teeth over 360° of periphery is shown by the wave form curve $e$. Thus, the teeth 26a in FIG. 6 are found at 0°—76 of the graph, and the teeth 26b are depicted at approximately 120°—72 and 240°—72 on the graph in FIG. 2 curve $e$. By varying the tooth form but maintaining the same base circular pitch, the effective speed of output motion at any one point of the rotation of gear 20 will be that of the particular tooth form engaging the teeth of the gear member such as 24. Gears having the characteristics of producing the wave form $e$ (similar to a wave form produced by a drag link mechanism) shown in FIG. 2 may be produced either by use of a special gear shaper cutter, by utilizing a standard shaper cutter and varying the speed of revolution thereof during the shaping of the gear, by hobbing the gear with an attachment to vary the rotational speed of the gear blank relative to hob rotation or by generating each tooth form separately so as to produce the desired wave form in terms of output required. The wave form $e$ in the graph (FIG. 2) may be visually contrasted with the linear wave form $d$ of a standard 72 tooth gear where all teeth thereon are uniform. The curve $d$ is a straight line indicating that the output of a 72 tooth gear with uniform shape and spacing is uniform for all 360° of the gear periphery. The wave form $f$ represents a special wave form obtainable with the construction shown in FIG. 12 as shall be discussed hereinafter. The wave form $f$ is characterized by abrupt changes in angular velocity output whereas the wave form $e$ of gear 20 is characterized in progressive changes in acceleration and deceleration of angular velocity output as shall become apparent.

Figure 3:
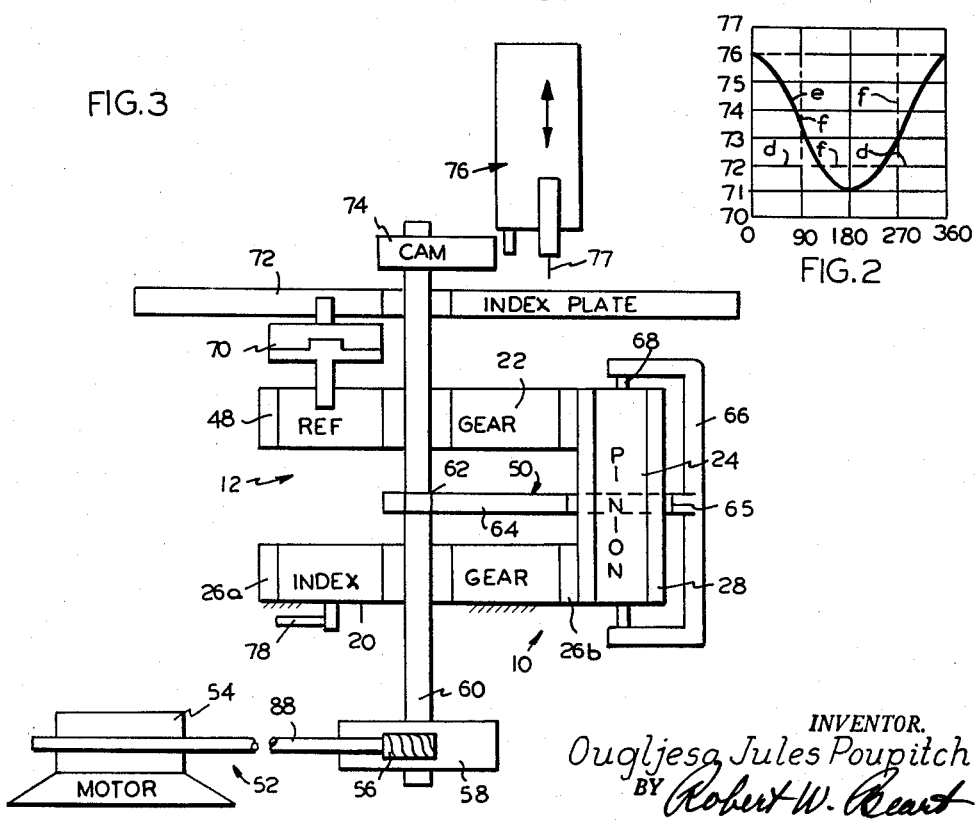
FIG. 3 is a semidiagrammatic showing of the mechanism in FIG. 6.

As illustrated semidiagrammatically in FIG. 3, gear members 20, 22 and 24 are used in an epicyclic gear train. Gear member 22, referred to as a reference gear, has teeth 48 on its outer periphery, said teeth being uniform in spacing and form. For illustration purposes, the reference gear will be considered to have 72 teeth on its periphery. The reference gear 22 is rotatably mounted coaxially with the fixed index gear 20. The pinion or third gear means 24 is mounted so as to simultaneously mate or mesh with both the index gear and the reference gear and is capable of being revolved about the periphery of the two gears. It is important to note in the instant illustration that the index gear has two more teeth than does the reference gear, i.e., the index gear 20 is formed with a total of 74 teeth in addition to the varying shapes of the individual teeth. The reference gear and the index gear have substantially identical outer diameters and thus one revolution of the pinion 24 about the periphery of the index gear and the reference gear, will cause the rotatably mounted reference gear to move two teeth relative to the fixed index gear. The movement of two teeth of 72 teeth represents 1/36 of the peripheral measurement of the gear 22, or equal to 10°. Thus, 36 revolutions of the pinion would cause one revolution of the reference gear about its axis.

As shown in FIG. 3 the index gear 20 is relatively fixed and the pinion gear 24 is mounted on a planet carrier 50. Power input means 52 is shown in the form of a motor 54 which drives a worm gear 56 which in turn drives a face gear 58 attached to a shaft means 60. The planet carrier 50 and the shaft means 60 are fixed to each other in a suitable manner at 62. The planet carrier means 50 comprises a plate 64 which is apertured at 65 and mounts a U-shaped or yoke member 66 at the end thereof. The pinion 24 is rotatably mounted on the pinion shaft 68. The pinion 24 extends through the aperture 65. In this mounted position it may be held in simultaneous mesh with the index gear 20 and the reference gear 22. The reference gear 22 is mounted rotatably on the shaft means 60. The index gear 20 is relatively fixedly mounted to a frame and permits relative rotation of shaft means 60. The output of the epicyclic gear train is through a coupling means 70 in the form of a clutch means through which reference gear 22 drives a means to be indexed 72 in the form of an index plate. The shaft means 60 in addition to driving the yoke 66 which in turn moves the pinion 24 about the periphery of the gears, also drives a cam means 74 at the upper end thereof, said cams means 74 in turn driving a reciprocating member 76.

As the power input means 52 causes the shaft means 60 to rotate at a constant speed, the pinion 24 simultaneously mating with the index gear and the reference gear will cause the index plate to be advanced 10° with each revolution of the shaft means 60. Because of the varying tooth spacing of the index gear in addition to the greater number of teeth relative to the reference gear, the output movement of the reference gear is non-linear, which in turn translates a nonlinear movement to the index plate. The precise wave form of the output motion as transmitted to the index plate 72 in the above described example is represented by utilization of the curve $e$ in FIG. 2 to produce the curve $c$ in FIG. 1. The graph in FIG. 1 plots output movement of the index plate 72 as received by the coupling means 70 attached to the reference gear 22 against the input movement of shaft means 60. If the index gear and the reference gear each have uniform teeth, but one has two teeth less than the other, with the teeth on each gear being uniform in interdental spacing, a linear output shown by the straight line $a$ in the graph is obtained assuming that the output is in terms of a 10° revolution of the reference gear relative to the index gear in the epicyclic gear train shown. By placing a predetermined number of teeth in a predetermined segment of the index gear and making these teeth substantially identical in shape and spacing as the corresponding segment of the reference gear, no output motion will be received by the reference gear over this segment or sector upon revolution of the pinion 24. It will be perceived that if the reference gear 22 and index gear 20 were identical, then there would be no output motion whatsoever in the gear train 12. The segment of the index gear which has teeth identical to the teeth of the reference gear can be utilized in an indexing mechanism to provide a "dwell" time. When an index gear 20 is made with a varying tooth form around the periphery thereof having a curve substantially similar to that shown as curve $e$ in FIG. 2, the output of the epicyclic gear train shown in FIG. 3 will produce curve $c$ in FIG. 1 when the reference gear has 72 teeth thereon and assuming that the reference gear has a standard amount of backlash in the teeth of the gear. The amount of dwell time in the index plate is the dimension $x$ in the curve $c$. If the reference gear 22 was in tight mesh with no backlash relative to the pinion 24, then that portion of curve $c$ from 140° to 210° would in fact represent a backward movement of the index plate 72. This does not usually occur in constructions of this type because of the predetermined backlash usually built into the gear set between the reference gear teeth 48 and the pinion teeth 28, the net effect of which is to produce a dwell time (no movement of plate 72) over a portion of the curve having the dimension $x$. The reason for preferring to use the backlash of the reference gear 22 and pinion 24 over a portion of the dwell time, rather than making the teeth of the index gear completely identical with the reference gear over the entire segment desired for the dwell time, is for manufacturing convenience. While it is possible to make the index gear teeth over the dwell time segment substantially identical with the reference gear teeth, it is easier in certain manufacturing techniques to have a small incremental change in the teeth for the particular application shown.

The curve $c$ of the graph in FIG. 1 representing the output movement of gear train 12 is characterized as providing a smooth progressive acceleration then a deceleration of the index plate 72 immediately adjacent to the end and the beginning of the dwell time. More particularly, the deceleration illustrated in curve $c$ takes place over the range of 60° to 140° and the acceleration takes place over the range 240° to 300°. As will be appreciated, acceleration is represented in FIG. 1 in the change in slope of the curves in an upwardly direction and deceleration is represented by a change in slope in a downwardly direction. A sharp acceleration and deceleration curve for the index plate 72 in FIG. 3 is shown as curve $b$ in FIG. 1, said curve $b$ also being characterized as having a long dwell time $y$. This curve $b$ may be obtained by utilizing the construction of index gear shown in FIG. 12. The index gear shown in FIG. 12 (index gear 20$b$), is formed of two half gears, one half having teeth $b_1$ with the shape and spacing obtained in a 76 tooth gear construction, while the other half has teeth $b_2$ having a shape and spacing of 72 tooth gear. The teeth on each half of the gear have an identical outer diameter, root diameter and BCP. The number of teeth $b_1$ is of course 38, while there are only 36 $b_2$ teeth. The teeth $b_2$ in the lower segment of the gear 20$b$ as shown in FIG. 12 are made identical to all of the teeth 48 on the reference gear. The coaction of the gear 20$b$ with a pinion 24 provides a nonlinear wave form as represented by the line $f$ shown in FIG. 2. The abrupt changes in angular velocity should be noted. When a gear 20$b$ is used in the gear train 12, all other parts being the same, 180° of rotation of the pinion 24 of the epicyclic gear train 12 produces a dwell time $y$ (from 90° to 270°) as shown in FIG. 1. However, the acceleration and deceleration where the curve $b_1$ leaves and joins the curve portion $b_2$ in FIG. 1 are very abrupt, which is not always a desirable characteristic, much depends on the object being indexed and its function. The abrupt change in acceleration and deceleration of the curve $b_1$–$b_2$ adjacent the dwell time $y$ of the index plate is not desirable when the index plate 72 is used for pickup and feeding of washers as shall be explained hereinafter. It should be understood that the gear 20$b$ may be made as a single gear body rather than from two half gears mounted on a support as shown in FIG. 12. All of the teeth $b_1$ are similar to teeth 26$b$ of FIG. 4 and teeth $b_2$ are similar to teeth 26$a$ of FIG. 4.

While the particular wave form $c$ represents an output motion that is desired for the apparatus 14 to be described hereinafter, it will be apparent that variations of tooth forms on the index gears such as 20 or 20$b$ may be varied within reasonable limits as determined by the form of the gear teeth. For example, on a 72 tooth standard gear, a variation of tooth forms of approximately 7–8 teeth in each direction is possible, i.e., the tooth forms may be those in the range of a 64 to 80 tooth gear or any increment therebetween while maintaining conjugate action. By simultaneously varying the tooth forms on the pinion, the range is effectively doubled. Thus the particular wave forms "$e, f, b$ and $c$" shown are to be considered illustrative rather than limiting. It will be further realized that the nonlinear gearing may be utilized in a number of different types of epicyclic gear trains other than the one illustrated.

One particular advantage that accrues to the instant epicyclic gear train 12 is that the phasing of the curve $c$ relative to the input motion of the shaft means 60 may be varied to suit. Thus when the shaft means 60 is utilized to drive the epicyclic gear train 12 simultaneously with another device such as the reciprocating means 76 and in timed relation, the exact synchronization may be varied while the power input means 52 is in motion. This may be readily accomplished by having adjustment means 73 to adjust the relatively fixed position of the index gear 20. The adjustment is possible since the pinion 24 will have conjugate action with all orientations of gears 20 and 22. This is particularly important when there is a plurality of different index plates such as 72 (which will have small deviations therein due to manufacturing tolerances) which may be substituted one for the other. By changing the relatively fixed position of the index gear, exact synchronization of the nonlinear output may be obtained relative to the output motion of the cam 74. This ability to change the phasing in a very simple manner is of great importance in mechanical movements utilizing nonlinear gearing and is often difficult to obtain in other forms of providing nonlinear output with constant input.

*Assembly apparatus*

Figure 5:
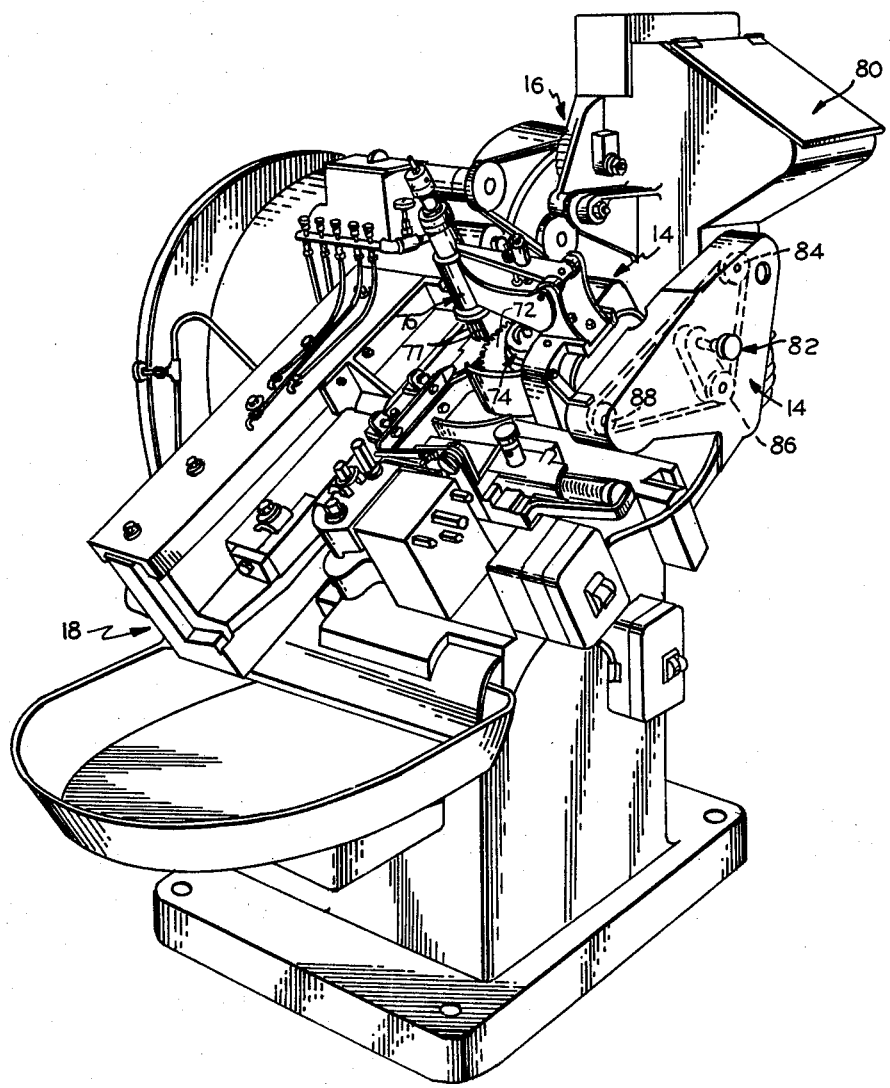
FIG. 5 is a perspective view of a thread rolling machine having an assembly attachment mechanism utilizing the invention.

The automatic assembly apparatus shown in FIG. 5 is specifically designed to make screw and washer assemblies sometimes identified as "Sems." The screw blank member is separately fed from a hopper 80 through a feeding means 16 to the vicinity of washer hopper apparatus 14.

The apparatus includes a hopper 80, fastener feeding means 16, as well as the washer hopper apparatus 14. These may be attached to a thread roller apparatus 18 of known design approximately midway on the blank chute. Only minor modifications are necessary to attach the fastener feeding means and the washer hopper means to the thread rolling unit. The design of the thread rolling unit and the fastener feeding means form no part of the instant invention. However, for background purposes, it will be advantageous to give a brief description of their operation. Thread forming machines generally have a single chute for receiving fastener blanks which are to be threaded between the thread rolling dies. In the instant device, the single chute is replaced by an upper and lower chute, see for example U.S. Patent 2,321,548. The fastener blanks are placed in the fastener hopper 80, feed down the upper chute and are selected one at a time by a pair of fingers 77 attached to the reciprocating mechanism 76, which transfer them downward to the lower chute. During this transfer, the shanks of the screw blanks are directed into the hole of a washer properly positioned by means of the washer carrying disc 72 to form a preassembly. It is the washer carrying disc 72 and the apparatus 14 for causing the correct movement thereof with which the instant invention is concerned. This will be discussed in detail hereinafter.

When the fastener preassemblies reach the lower chute, they are released by the fingers 77 and the blank and washer assemblies continue down the lower chute to the threader transfer mechanism where they are selected one at a time and thread rolled in the regular way. The washers are held beneath the screw head by the rolled thread, the washers being free to rotate relative to the screw.

The washers are disposed in a heterogeneous mass in the washer hopper (formed by side walls 104 and disc 72) of the unit. The intermittent rotary motion of the washer carrying disc 72 passing under the washers, causes them to fall into cavities 73 on the periphery of the disc or plate 72 and to be carried around under the fingers 77. The intermittent rotary motion of disc 72 is synchronized with the motion of the fingers 77 so that a washer is properly positioned every time the fingers 77 descend. The motion of the fingers 77 is basically reciprocal and the motion of the washer disc 72 is basically rotary although the rotary motion is nonlinear as has been discussed. The fastener feeding means 16 at the output end 76 and the washer hopper apparatus 14 are driven by an independent motor unit 54 through a V-belt drive over adjustable pulleys. A preferred way of adjusting the speed of the motor 54 is to provide a spring loaded variable pulley 84 attached to the motor for driving a pulley on the input shaft 86 for the worm gear 56 by passing over an idler pulley 88. Adjustment means 82 adjusts the length of the belt to thereby automatically adjust the effective size of the pulley 84 and thereby vary the input speed to the worm 56.

In changing from one diameter screw to another it is necessary to change the gripping fingers 77 on the reciprocating device 76 at the output end of the fastener feeding means 16, this operation being well known.

In changing from one diameter of washer to another it is necessary to change the washer carrying disc or index plate 72. Further, various designs of washers are best handled by various designs of apertures in the index plate 72 which necessitates change for various styles and designs. This is accomplished in a manner to be hereinafter explained.

Prior art devices comprising the three major components 14, 16 and 18 were a vast improvement over hand-assembly of washers to fastener blanks. However, it has been found in actual usage of prior art devices that many sizes of washers and fastener blanks could not be fed to the assembly position to afford preassembly with a screw blank at a speed commensurate with the capabilities of the entire apparatus. Index discs did not present 100% "aperture fill" of the index plates resulting in reduced efficiency of the expected production. It is in greatly increasing these efficiencies, as well as allowing a much higher speed of operation of the total apparatus, that the epicyclic gear train of the instant invention has proved to be greatly advantageous.

More particularly, when a homogeneous mass of washers or lock washers are located in the washer hopper, the plate 72 must perform two different functions. First, the plate must be capable of separating a single washer from the homogeneous mass of washers and locating this single or individual washer in an aperture or indentation 73 in the index plate periphery, and secondly, it must locate the individual washer in the indentation 73 at the assembly station in timed relationship to the movement of the fastener feeding fingers 77. Since there must be a definite "dwell" time at the assembly station to permit telescoping of the fastener blank through the aperture in the washer, a problem is presented in the rapid intermittent operation of the index plate. The rapid intermittent motion can cause washers to jump or be "kicked out" of the apertures or indentations 73 by the abrupt starting and stopping of the washer plate from each dwell period necessary for assembly of the fastener blank and washer. The particular epicyclic gear train 12 with the nonlinear gearing therein, is especially advantageous in providing a smooth acceleration and deceleration of the washer index plate while still providing the dwell time required. The epicyclic gear train 12 is particularly efficacious because it is very compact and the pinion 24 is constantly in motion so that there is not the sudden jar accompanying each stop and start. Ratchet mechanisms which the prior art depended upon caused sudden shock which led to these undesirable ends and the resulting inefficiencies. Further, the motion is sufficient to cause the pick up of discrete washers from the homogeneous mass of washers into the index plate openings 73. Minute unintentional tooth to tooth errors (deviations from theoretical ideal) in the gearing are sometimes unavoidable in manufacturing the gears 20, 22 and 24 at a reasonable cost. In most instances these errors are at a minimum and provide at most a very slight overall vibration to the hopper unit. This usually does not affect efficient separation of the individual washers from the mass in the hopper means 14. If the tooth to tooth errors (unintentional) or harmonic vibrations caused by the gearing becomes a problem in feeding certain sizes of washers, they may be easily dampened in the adjustment means as shall become apparent. It is to be noted, however, that it is only in certain extreme cases that the damping means is necessary or desirable.

Another disadvantage found in prior art apparatus was that in changing to a different washer disc 72, accomplishing the synchronization of the individual washer disc plates 72 with the fastener feeding fingers 77 was a somewhat tedious and difficult job. As shall become apparent, the instant hoppering apparatus provides for quick easy manual adjustments for synchronization while the machine is in operation.

Figure 7:
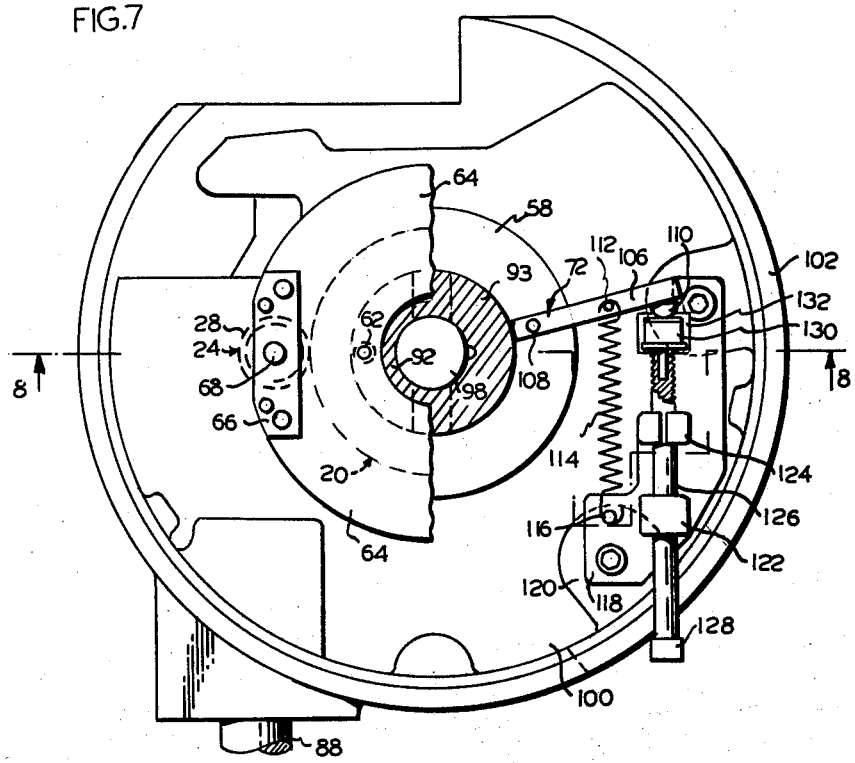
FIG. 7 is a sectional view taken substantially along line 7—7 of FIG. 6 or along line 7—7 of FIG. 8.
Figure 8:
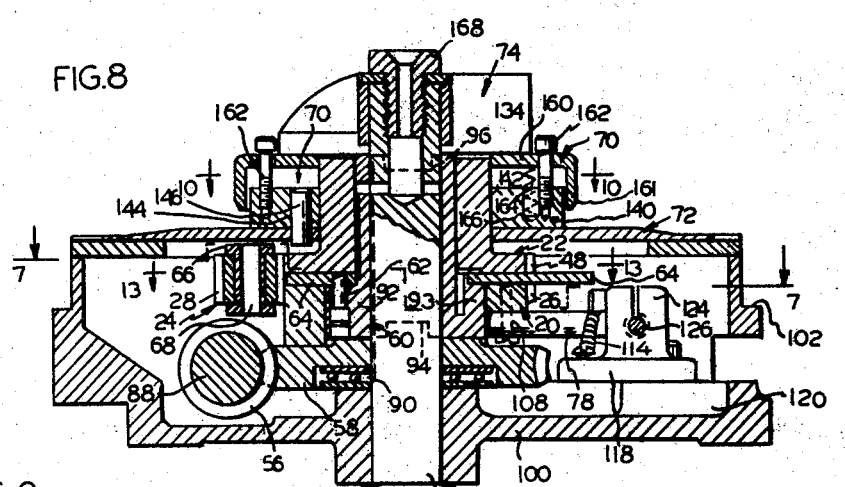
FIG. 8 is a sectional view along line 8—8 of FIG. 7.

The washer hopper apparatus 14 shown in FIGS. 5 through 13 is substantially similar to the semidiagrammatic showing in FIG. 3. Similar parts will be given similar reference numerals. As best shown in FIGS. 7 and 8 the input shaft 88 drives the pinion 56 which in turn drives a worm gear 58 mounted on suitable bearings 90. The input shaft 88 is attached to a pulley driven by a belt through the speed adjustment means 82 aforediscussed. The hub of the worm gear 58 is formed with a keyway 94 for driving a cylindrical drive member 92 (which is essentially a shaft means 60) which is coaxial with the gear 58. The upper end of the cylindrical drive member 92 has a one way keyway 96 for driving the cam 74 which extends into the hopper area for driving the reciprocating output end 76 of the fastener feeding means 16. The cylindrical drive member 92 has an enlarged hub portion 93 at the bottom end which is fixedly attached to the pinion carrier plate member 64 by means of a suitable bolt means 62 which links the pinion carrier to the cylindrical drive member. As shown in FIGS. 7 and 8, the U-shaped end of 66 for carrying the planet shaft pin 68 is disposed so as to be within the confines of the radial extent of the pinion 24. This is done for purposes of conserving space.

As best perceived in FIG. 8, a stationary shaft 98 mounts the bearing 90 and gear 58, the cylindrical driving member 92 which is in effect the drive shaft means 60 of the epicyclical gear train, and the cam means 74. All of the foregoing are mounted for rotary movement about the stationary shaft 98. The shaft 98 is mounted in a casting 100 having a peripheral radial shoulder 102 for mounting the side walls 104 of the hopper means 14. The casting 100 is directly attached to the thread rolling apparatus 18 in a manner such as is shown in U.S. Patent No. 2,343,798.

The epicyclic gear train is also mounted in coaxial relationship to the shaft 98. The index gear 20 is mounted in surrounding relationship to the hub 93 of the cylindrical drive member 92 and in a manner to permit its relative rotation thereto.

The adjustment means 78 for the index gear 20 comprises an elongated lever arm member 106 of sturdy construction and is fixed to the underside of the gear member 20 by a bolt means 108. The lever arm 106 is substantially longer than the radial dimension of the gear 20. The free end of arm 106 is formed with a boss 110 as best shown in FIGS. 7 and 12. An upstanding projecting pin 112 is formed intermediate the ends of the arm 106 to mount one end of a spring 114. The other end of the spring 114 is mounted on a screw 116 which in turn is mounted on a lug member 118 mounted to a boss 120 of the casting 100 (see FIGS. 7 and 8). The lug member 118 is formed with two upstanding apertured bosses 122 and 124. Boss member 124 is provided with a threaded aperture and is split so as to provide a compression force upon a bolt member 126. The bolt membert has a head 128 which extends exteriorly of the hopper as best shown in FIGS. 6 and 7. The other end of the bolt member 126 is formed in a manner to retain a damping means 130 which is suitably fixed to the end of the screw member 126. The damping means 130 is held in place by means of a casing 132 and is composed of semiresilient material for damping out minute tooth to tooth unintentional errors which, if present, may produce undesirable vibrations. However, it is to be noted that the damping means 130 in the casing 132 is only necessary in extreme situations and for many sizes of washers is not needed. Occasionally, at certain speeds and with certain size washers, harmonic vibrations and tooth to tooth vibrations cause a problem which is readily solved by the damping means 130. It will be observed that the turning of the head 128 of bolt 126 will cause movement of the index gear 20 so as to adjust the relative position of the index gear to the input movement supplied by shaft 88. This adjustment means is easily accessible and extremely advantageous for synchronization of the washer plate 72 with the reciprocating fastener feeding fingers 77.

The means linking the output of the epicyclic gear train 12 with the washer index plate 72 is in the form of a clutch means 70. The clutch means 70 comprises an axially elongated hub portion 134 on the reference gear 22. The periphery of the hub 134 is formed with a plurality of projections 136, the outer diameter of which is slightly less than the bore diameter 142 of a plate member 140. The plate member 140 is shown only semidiagrammatically in FIG. 8 (due to space limitations), the construction being best shown in FIG. 10. The plate member 140 is formed with a through bore 144 (located in the upper right hand quadrant of FIG. 10) which mounts a pin 146 for driving the washer plate 72. It will be recalled that the washer plates 72 may be varied to present plates with appropriate size apertures to handle the size of washers to be separated and indexed. The pin 146 serves as the driving linkage between the plate 140 and any particular washer pick up and indexing plate 72. The plate 140 is formed with a plurality of channels or grooves in the four quadrants thereof, groove 148 being at right angles to groove 150, therebeing four sets of grooves or channels 148 and 150 in the plate 140. The grooves 148 form a right angle shoulder to provide an abutment for square pins 154 which are spring loaded into engagement with the shoulders 152. The ends of pins 154 project for engagement with the projecting abutments 136 on the hub of the second gear means 22. Lugs 155 on pins 154 are mounted in suitable transverse bores 157 in the plate 140 and permit movement of the pins 154 so as to allow the projections 136 to pass by the ends of the square pins 154 when a jam is encountered, but retain the pins 154 from radially outward movement. Springs 156 are fixedly mounted to suitable pins 158 on plate 140 and in channels 150 to hold the square pins 154 in desired position.

The clutch means 70 also includes spring pad plate 160 which is annular in shape and has a down turned edge 161. Spring pad plate 160 is fixedly mounted to the plate 140 by suitable bolt members 162 as shown in FIG. 10 and FIG. 8. It will be noted that the bolts 162 have shanks of such a nature as to permit relative axial movement of the spring pad plate member 160 and the plate member 140. Biasing springs 164 are located in spring bores 166 which retain the springs 164 so as to put a separating bias on the spring pad plate 160 and the plate 140. The top side of the plate 160 engages the under side of the cam 74 for relative movement thereto. The spring pad plate 160 is retained on the shaft 98 by the cam 74, the cam 74 in turn being held on the shaft 98 by a suitable cap screw 168. The construction aforediscussed facilitates removal of the index plate 72. By removal of the cap screw 168 and the cam 74, the entire clutch means 70 may be removed as a unit permitting the insertion of a new index plate 72. The pin 146 is merely dropped into a corresponding bore in the new index plate and the parts are reassembled, the cam retaining its original orientation to the cylindrical drive member 92 by virtue of the one way spline connection 96. Minute errors in the location of the index plate 72, plate 140, and linking pin 146 are very readily compensated for by the adjustment of screw 126 as aforenoted.

Figure 9:
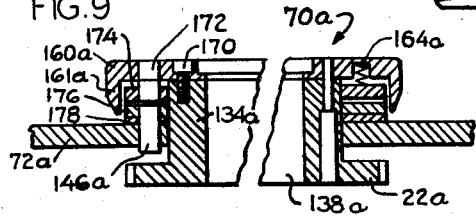
FIG. 9 is a view of an alternate construction of a clutch mechanism which may be utilized in the assembly mechanism shown in FIGS. 6, 7 and 8.

An alternate form of clutch means is shown in FIG. 9. Similar parts will be given similar reference numerals with the addition of the suffix "a." The clutch means 70a is similar in many respects to the clutch means 70. The hub 134a is not formed with projections and instead is directly mounted to the plate 160a by suitable bolt members 170. The plate 160a has a pin 172 dependingly mounted thereon to provide the driving connection between two opposed toothed members 174 and 176. The upper annular member 174 has teeth on the lower portion thereof which are adapted to mate with teeth on the upper portion of annular member 176. Annular member 176 is formed with a fixed pin 146a which directly attaches to the index plate 72a. The upper toothed member 174 is spring loaded by a suitable spring 164a into engagement with member 176, the pin 172 permitting axial floating movement of member 174. The clutching action when there is a jam on the plate 70, is performed by the construction of the teeth on members 174 and 176 so as to have relative sliding movement on a predetermined load. This particular construction performs the clutching action adequately, but suffers the disability of requiring removal of a plurality of bolts such as 170 in order to change the washer disc 72a. In most other respects the clutch 70a serves the same functions as the clutch 70.

Although specific embodiments of the invention have been shown and described, it is with full awareness that many modifications thereof are possible. The invention, therefore, is not to be restricted, except insofar as is necessitated by the prior art and the spirit of the appended claims.

What is claimed as the invention is:

1. An index mechanism comprising power input means, means to be indexed, and indexing means in power transmitting relationship intermediate said power input means and said means to be indexed, said indexing means comprising toothed reference gear means, toothed index gear means, and third gear means simultaneously mating with said reference gear means and said index gear means, one of said reference, index and third gear means being relatively fixed, said index gear means having at least a pair of teeth thereon with an interdental spacing different from the interdental spacing of the teeth on said reference gear means, another pair of teeth on said index gear means having substantially the same interdental spacing as the teeth of said reference gear means whereby said third gear means simultaneously mating with said reference gear means and said index gear means will product a nonlinear rotary movement in said means to be indexed which is characterized as having acceleration, deceleration, and dwell time.

2. An index mechanism comprising power input means, means to be indexed, and indexing means in power transmitting relationship intermediate said power input means and said means to be indexed, said indexing means comprising circular toothed reference gear means, and circular toothed index gear means, said index gear means being characterized as having at least one tooth thereon of different shape and spacing relative to the next adjacent tooth as compared to the shape and spacing of said teeth on said reference gear means and another tooth of substantially the same shape and spacing relative to the next adjacent tooth as compared with the teeth of said reference gear means whereby means in power transmission between said reference and said index gear means will produce a movement in said means to be indexed which is characterized as having acceleration and deceleration.

3. An index mechanism comprising power input means, means to be indexed, and indexing means in power transmitting relationship intermediate said power input means and said means to be indexed, said indexing means comprising toothed reference gear means, toothed index gear means, one of said reference and index gear means being fixed, and third gear means simultaneously mating with said reference gear means and said index gear means, said index gear means being characterized as having a different total number of teeth as compared to said reference gear means, at least one tooth of a first size thereon spaced from the next adjacent tooth a different distance from the spacing of the teeth of said reference gear means and another tooth thereon of a second size different from said first size and having substantially the same spacing to the next adjacent tooth as the teeth of said reference gear means, said teeth of said reference gear being of said second size, whereby said third gear means simultaneously mating with said reference gear means and said index gear means will produce a movement in said means to be indexed which is characterized as having acceleration, deceleration, and dwell time in each step by step advancing movement thereof, the amount of said advancing movement being determined by the differential in numbers of teeth between said reference gear means and said index gear means.

4. A gear train having first, second and third toothed gear means each having a predetermined number of teeth, one of said gear means being relatively fixed, said first gear means having at least some but not all of its teeth similar in size, shape and interdental spacing to another of said gear means whereby meshing rotative coaction of said first, second and third gear means will afford no output motion over the segments of similar teeth.

5. An index mechanism comprising power input means, means to be indexed, and indexing means intermediate said power input means and said means to be indexed and in power transmitting relationship thereto, said indexing means comprising first, second and third cooperating circular toothed gear means, said first gear means being further characterized as having at least one gear tooth thereon of a size, shape and spacing relative to adjacent teeth different from the size, shape and spacing of the teeth on said second gear means and another gear tooth of a size, shape and spacing relative to adjacent teeth substantially identical to the size, shape and spacing of the teeth of said second gear means whereby said third gear means simultaneously mating with said first and said second gear means will produce a movement characterized as having acceleration, deceleration, and dwell time.

6. An index mechanism comprising power input means, means to be indexed, and indexing means intermediate said power input means and said means to be indexed and in power transmitting relationship, said indexing means comprising first, second and third cooperating toothed gear means, said first gear means being further characterized as having a first number of teeth with at least one gear tooth thereon spaced from adjacent teeth different from the spacing of the teeth on said second gear means and another gear tooth spaced from adjacent teeth substantially the same distance as spacing of the teeth of said second gear means, said second gear means having a second and different number of teeth, whereby said third gear means simultaneously mating with said first and said second gear means will produce a movement characterized as having acceleration and deceleration.

7. An index mechanism comprising power input means, means to be indexed, and indexing means intermediate said power input means and said means to be indexed, said indexing means comprising first, second and third cooperating toothed gear means, said first and second gear means having different numbers of teeth, and at least one of said gears having nonuniform interdental spacing between the teeth thereon, whereby said third gear means simultaneously mating with said first and second gear means will produce a step by step indexing movement in said means to be indexed, characterized as having acceleration and deceleration.

8. An epicyclic gear train having input, output and transfer means for modifying the input motion relative to the output motion comprising first and second gear means mounted in coaxial relationship for a mating coaction with a third gear means, said first, second and third gear means each having a predetermined number of teeth, said first gear means having a different number of teeth than said second gear means, said first gear means having at least a portion of its teeth of a variable shape, size, and variable interdental spacing whereby relative movement of said first, second and third gear means produces a nonlinear output motion when provided with a linear input motion.

9. The gear train set forth in claim 8 wherein said first gear means has at least a portion of the teeth thereon of identical spacing and shape as compared to the teeth of said second gear means and one of said first and second gear means is fixed whereby relative motion of said first, second and third gear means with a constant input motion to the gear train will produce no output motion from the gear train.

10. The gear train set forth in claim 9 wherein said first gear means is further characterized as having at least fifty percent of the periphery thereof formed with teeth identical to the teeth of said second gear means and the remainder of the periphery contains teeth which are different in shape and spacing as compared to the teeth of said second gear means whereby said third gear means upon being mounted to make a complete rotation about the periphery of said first and second gear means in simultaneous mesh therewith will produce an output characterized as having at least fifty percent dwell time on each revolution of said third gear means.

11. The gear train set forth in claim 9 wherein said first gear means is further characterized as having not more than fifty percent of the periphery thereof formed with teeth identical to the teeth of said second gear means and the remainder of the periphery contains teeth which are different in shape and spacing as compared to the teeth of said second gear means whereby said third gear means upon being mounted to make a complete rotation about the periphery of said first and second gear means in simultaneous mesh therewith will produce an output characterized as having not more than fifty percent dwell time on each revolution of said third gear means.

12. The gear train set forth in claim 9 wherein said first, second and third gear means have substantially circular outer diameters.

13. The gear train set forth in claim 9 wherein said first and second gear means have substantially the same outer diameter and the teeth on both gear means have substantially the same base circular pitch.

14. The gear train set forth in claim 8 wherein said first, second and third gear means have teeth of involute form.

15. The gear train set forth in claim 8 wherein said third gear means has a lesser number of teeth than said first and second gear means, each tooth thereof having a height measured parallel to the axis thereof of sufficient dimension for simultaneous coaction with teeth on said first and second gear means, and all teeth on said third gear means being substantially uniform in size and spacing.

16. Hopper means for indexing individual washers from a homogeneous mass of washers into a station in timed relationhip to a fastener feeding device comprising hopper wall means defining an area for containing a homogeneous mass of washers, rotary washer plate means located adjacent the bottom of said hopper wall means having washer receiving indentations in the periphery thereof in uniformly spaced relationship, means rotating said washer plate means with a nonlinear motion about a fixed center, said means rotating said washer plate comprising power input means and first, second and third cooperating toothed gear means, coupling means for coupling said first, second and third gear means to said washer plate means, said first and second gear means being mounted in coaxial relationship for simultaneous mating coaction with said third gear means, said first gear means having a different number of teeth than said second gear means and further characterized as having at least a portion of its teeth of variable shape and spacing whereby relative movement of said first, second and third gear means by said power input means produces a nonlinear movement of said washer plate member to thereby separate individual washers from the homogeneous mass and place individual washers in said washer receiving indentations at said station.

17. An attachment to a thread rolling apparatus comprising screw element feeding means fixedly mounted in a single location and operable to feed screw elements at a station, a washer feeding device located below said screw element feeding means and adapted to dispose washers at said station for insertion of the screw elements therewithin, said washer feeding means comprising washer pick up plate means and power input means operable to simultaneously actuate said screw element feeding device and said washer pick up plate means in timed relation, said power input means comprising shaft means driving said screw element feeding device, a first gear means concentric with said shaft means and relatively fixed against rotation while permitting relative rotation of said shaft means which projects therethrough, a second gear means also concentric with said shaft means having an outer diameter substantially identical to the outer diameter of said first gear means, said second gear means permiting relative rotation of said shaft means which projects therethrough, said second gear means being free for relative movement to said first gear means, said first gear means being characterized as having a lesser number of teeth than said second gear means and at least a portion of said teeth being identical in shape and spacing to the teeth of said second gear means, third gear means comprising a pinion carrier means fixedly mounted on said shaft means for rotation therewith and disposed intermediate said first and second gear means, said pinion carrier means carrying a pinion having uniform teeth thereon adapted to simultaneously mate with the peripheral teeth on said first and second gear means, said washer pick up plate means being movable in a rotary path intersecting said station and having a plurality of washer receiving indentations therein in uniformly spaced relation on the periphery thereof, said washer pick up plate means being coaxially mounted for relative movement to said shaft means which projects therethrough, and means coupling said second gear means and said washer pick up plate means, whereby one revolution of said shaft means causes revolution of said pinion carrier means to cause movement in turn of said second gear means, the motion of said washer pick up plate means being characterized as providing a dwell time corresponding to that portion of the rotation of said pinion about said first and second gear means wherein the teeth of said first and second gear means are identical in shape and spacing.

18. An auxiliary mechanism or attachment for a machine having screw element feeding means, said mechanism or attachment comprising a washer container, a movable device receiving screw elements from the screw element feeding means and telescopically preassembling screw elements with washers at a station, a rotary plate member associated with the washer container for feeding washers to the assembly station in the path of movement of a screw element to be received by said device, indexing means for operating said device and said rotary washer plate member in timed relation, said index means comprising an epicyclic gear train coaxial with said rotary washer plate and comprising first, second and third gear means, said first and second gear being substantially identical in outer diameter and disposed in coaxial arrangement with each other and with said washer plate, one of said first and second gear means being fixed, said third gear means being operable to simultaneously mate with said first and second gear means to cause relative movement therebetween upon constant input movement of said third gear means, means for supplying movement to said third gear means and to said screw feeding device in timed relation, means connecting the relative movement of the relatively movable member of said first and second gear means to said rotary washer plate, said first gear means being characterized as having a plurality of teeth thereon identical in shape and spacing to the shape and spacing of the teeth of said second gear means and a plurality of teeth thereon which are of different shape and spacing to the shape and spacing of said second gear means whereby said washer plate moves in timed relation in the path of said screw feeding device with the movement characterized as having dwell time.

19. A gear train comprising first and second gear means of substantially identical diameter mounted in coaxial relationship for a simultaneous mating coaction with a third gear means each having a predetermined number of teeth, said first gear means having a different number of teeth than said second gear means and further characterized as having at least a portion of its teeth of a variable shape and spacing whereby relative movement of said first, second and third gear means produces a nonlinear output when provided with a linear input.

20. An attachment for a thread forming machine which has a thread forming mechanism comprising a container for fastener blanks and means for feeding fastener blanks from the contained to the thread forming machanism, said attachment comprising automatic means for placing a washer on each fastener blank at an intermediate point of its travel from the container to the thread forming mechanism, said automatic means comprising positioning means for placing a fastener blank at a station at uniform predetermined intervals, means for moving a washer into position at said station for a telescopic movement of said fastener blank to said washer in timed relation to said predetermined intervals, said means for moving a washer comprising intermittent motion producing means, common input means for said fastener blank positioning means and said intermittent motion providing means, said intermittent motion means comprising first, second and third cooperating gear means one of which has variable interdental spacing between adjacent teeth affording a dwell time in said means for positioning a washer relative to the timed interval movement of the positioning means for the fastener blank.

21. In a machine for preassembling fastener elements and washer elements, the combination of separate members for moving fastener elements and washer elements into co-related, predetermined positions and epicyclic gear train means for moving said separate members comprising shaft means, first, second and third cooperating gear means, and means operable to simultaneously drive said shaft means to in turn drive said member for said fastener element, said shaft means also driving said third gear means, said second gear means being driven by said third gear means to in turn drive said member for moving said washer elements, said first gear means being associated with said shaft means and said second and third gear means to impart nonlinear output motion to said member for moving said washer elements when driven by said third gear means, said nonlinear motion being a repeating wave form which is in timed relation to the movement of the member for moving said fastener elements by said shaft means.

References Cited by the Examiner

UNITED STATES PATENTS

| | | | |
|---|---|---|---|
| 1,278,734 | 9/18 | Payne | 74—437 |
| 2,066,758 | 1/37 | Bassoff | 74—793 |
| 2,585,971 | 2/52 | Sloane | 74—437 |
| 2,635,326 | 4/53 | Godfriaux | 29—50 |
| 2,656,587 | 10/53 | Montgomery | 29—50 |
| 2,874,584 | 2/59 | Ahlport | 74—435 |
| 2,903,914 | 9/59 | Torzian | 74—820 |
| 2,979,971 | 4/61 | Dorash | 74—820 |
| 3,010,336 | 11/61 | Adair | 74—435 X |
| 3,081,648 | 3/63 | Dver | 74—437 X |
| 3,116,651 | 1/64 | Hardy | 74—801 |

FOREIGN PATENTS

| | | |
|---|---|---|
| 335,076 | 6/21 | Germany. |
| 15,426 | 8/93 | Great Britain. |
| 237,411 | 7/25 | Great Britain. |
| 158,816 | 5/57 | Sweden. |

BROUGHTON G. DURHAM, *Primary Examiner*.